(12) United States Patent
Jiang

(10) Patent No.: US 12,148,537 B2
(45) Date of Patent: Nov. 19, 2024

(54) FLOW THROUGH LIQUID METAL COOLED MOLTEN SALT REACTORS

(71) Applicant: Energy, United States Department of, Washington, DC (US)

(72) Inventor: Junhua Jiang, Idaho Falls, ID (US)

(73) Assignee: Energy, United States Department of, Washington, DC (US)

( * ) Notice: Subject to any disclaimer, the term of this patent is extended or adjusted under 35 U.S.C. 154(b) by 150 days.

(21) Appl. No.: 17/392,599

(22) Filed: Aug. 3, 2021

(65) Prior Publication Data

US 2023/0042504 A1 Feb. 9, 2023

(51) Int. Cl.
*G21C 15/247* (2006.01)
*G21C 19/307* (2006.01)
*G21C 3/54* (2006.01)
*G21C 15/28* (2006.01)

(52) U.S. Cl.
CPC ......... *G21C 15/247* (2013.01); *G21C 19/307* (2013.01); *G21C 3/54* (2013.01); *G21C 15/28* (2013.01)

(58) Field of Classification Search
CPC .......... G21C 1/03; G21C 1/22; G21C 15/247; G21C 19/307; G21C 19/31
USPC .......... 376/359, 360, 361, 402, 403
See application file for complete search history.

(56) References Cited

U.S. PATENT DOCUMENTS

| 3,262,856 | A | * | 7/1966 | Bettis | ................ G21C 1/02 976/DIG. 188 |
| 3,385,759 | A | * | 5/1968 | Bettis | ................ G21C 1/022 976/DIG. 30 |
| 3,635,286 | A | * | 1/1972 | Dubsek | ............... F04D 29/047 165/104.31 |
| 2012/0051481 | A1 | * | 3/2012 | Shu | .......... G21C 5/02 376/174 |
| 2014/0348287 | A1 | * | 11/2014 | Huke | ........ G21C 1/02 376/361 |
| 2017/0309353 | A1 | * | 10/2017 | Martynov | ............. G21C 19/28 |

* cited by examiner

*Primary Examiner* — Jack W Keith
*Assistant Examiner* — Jinney Kil
(74) *Attorney, Agent, or Firm* — Felisa L. Leisinger; Andrew C. Stark; Timothy L. Harney

(57) ABSTRACT

A liquid metal cooled molten salt reactor having a liquid metal vessel connected to a gas chamber that is connected to a molten salt chamber that is connected with a hot liquid metal vessel. A fuel salt that is withdrawn from the fuel salt tank through a feeding tube into the molten salt chamber from which the fuel salt is withdrawn into a salt separator. A purging gas is inserted into the gas chamber and withdrawn. A liquid metal coolant is dispensed from the liquid metal vessel through a plurality of dispensing nozzles into the molten salt chamber. The liquid metal coolant flows through the molten salt into a hot liquid metal vessel and then through a liquid metal filter into a liquid metal pump. The liquid metal coolant flows through a thermal exchanger subsequently returning to the liquid metal vessel.

5 Claims, 4 Drawing Sheets

FLOW THROUGH LIQUID METAL COOLED MOLTEN SALT REACTORS

GOVERNMENT INTERESTS

The United States Government has rights in this invention pursuant to Contract No. DE-AC07-05ID14517 between the U.S. Department of Energy (DOE) and Battelle Energy Alliance.

FIELD OF THE INVENTION

The present invention relates to flow through liquid metal cooled molten reactors.

BACKGROUND OF THE INVENTION

Molten salt reactors (MSRs) are nuclear fission reactors that use molten fluoride salts as the primary coolant at low pressure within the reactor system. MSRs are not complicated and prior art MSRs have shown that they are practical, predictable, non-corrosive, and stable. At the time of their conception, MSRs were a leap in thinking from the solid fuel reactors that were in use and experimentation in the 1950s. MSRs having fuel dissolved within the coolant as fuel salt, are able to reprocess fuel while the system is online. Though they are not new, MSRs are becoming a competitive front-runner of the Generation IV reactors currently being researched for commercial applications. The present-day domestic and international motivations to use MSRs, in addition to their practicality, predictability, non-corrosive nature, stability, are that they are also safer, sustainable, efficient, and cost effective.

For MSR applications, the salts must meet several criteria of evaluation which include, but are not limited to: present in liquid state with low vapor pressure for a wide temperature range correlated to reactor operation, compatible with standard materials of construction, stable against radiation and high temperature gases, chemically resistant to residual salt and fission products, and excellent in thermal and physical properties such as high specific heat capacity and low viscosity. As of now, the most studied salts for molten salt reactors are halide-based salts in the form of either fluorides or chlorides.

Generally, fluoride salts offer nominally low neutron captures while simultaneously working as moderators for sustained fission reactions. The first fluoride fuel-salt test reactor was successfully demonstrated with the Molten-Salt Reactor Experiment in the late 1960s. Since then, several different fluoride salt systems have been studied for emerging thermal- and fast-neutron molten salt reactors worldwide. However, the fluoride systems are expensive, and have high melting points, possible tritium proliferation concern, and poor solvation to actinide-fluorides. By contrast, these issues can be potentially addressed using chloride salts. Recently, chloride-fueled salts have generated interest for use in fast-spectrum reactors even after considering that chlorine has two stable isotopes ($^{35}$Cl and $^{37}$Cl) and higher neutron absorption. Assuming that the chemistry and handling of chloride melts can benefit from the progress of chloride pyroprocessing and a fast-neutron spectrum will alleviate the need of in-reactor fuel processing. Several chloride based MSRs have been designed, however, none of them have been operated to criticality.

In addition to intensive evaluation of molten salts for MSRs, a unique class of thermal fluids—liquid metals have been studied as primary coolants in nuclear reactors. According to the liquid metals used, several types of reactors have been designed and successfully demonstrated for fast reactors in the past few decades. The advantages of liquid metals respectively to molten salts include: (1) wider operating temperature range; (2) lower melting point, thus lower energy consumption for keeping the fluid above this point; (3) higher boiling point and lower vapor pressure which allows operation at high temperatures; (4) larger thermal conductivity which implies wider heat transfer coefficients for elementary geometries; and (5) higher allowable heat fluxes and lower viscosity. The improved heat transfer leads to improved receiver efficiency, reduced wall superheating thus lower radiation and convective losses and thermo-mechanical stresses. Compared to molten salt reactors, the biggest disadvantage of liquid metal cooled reactors is the use of traditional fuel elements, the fabrication of which is challenging. Therefore, there is a need for a liquid metal cooled molten salt reactor that combines the advantages of molten salt reactors and liquid metal fuels to eliminate the need of traditional fuel elements, increase burn-up efficiency via in-reactor pyroprocessing, and achieve superior safety qualifications.

SUMMARY

Embodiments of the invention relate to a liquid metal cooled molten salt reactor.

According to one aspect of the present invention, a liquid metal cooled molten salt reactor having a core containing a liquid metal vessel fluidly connected with a gas chamber. The gas chamber is fluidly connected with a molten salt chamber. The molten salt chamber is fluidly connected with a hot liquid metal vessel. The liquid metal cooled molten salt reactor has a fuel salt tank containing a fuel salt. The fuel salt is withdrawn from the fuel salt tank through a fuel salt feeding tube into the molten salt chamber. And, the fuel salt is withdrawn from the molten salt chamber through a fuel salt effluent tube into a salt separator. There is a purging gas inlet that inserts a purging gas into the gas chamber. The purging gas is withdrawn from the gas chamber through a purging gas outlet. A liquid metal coolant is dispensed from the liquid metal vessel through a plurality of dispensing nozzles. The liquid metal coolant first enters the gas chamber and then enters the molten salt chamber. From there, the liquid metal coolant flows through the molten salt into a hot liquid metal vessel and then through a liquid metal filter that feeds into a liquid metal pump. The liquid metal coolant flows from the liquid metal pump through a thermal exchanger returning to the liquid metal vessel.

According to another aspect of the invention, a liquid metal cooled molten salt reactor having a core containing a liquid metal vessel fluidly connected with a molten salt chamber. The molten salt chamber is fluidly connected with a hot liquid metal vessel. The hot liquid metal vessel is fluidly connected with a gas chamber. The liquid metal cooled molten salt reactor has a fuel salt tank containing a fuel salt. The fuel salt is withdrawn from the fuel salt tank through a fuel salt feeding tube into the molten salt chamber. And the fuel salt is withdrawn from the molten salt chamber through a fuel salt effluent tube into a salt separator. There is a purging gas inlet that inserts a purging gas into the gas chamber. The purging gas is withdrawn from the gas chamber through a purging gas outlet. A liquid metal coolant dispensed from the liquid metal vessel through a plurality of dispensing nozzles into the molten salt chamber, the liquid metal coolant flows through the molten salt into a hot liquid metal vessel, the liquid metal coolant flows from the hot liquid metal vessel through a thermal exchanger and then into a liquid metal filter, the liquid metal coolant flows from the liquid metal filter into a liquid metal pump returning then to the liquid metal vessel.

BRIEF DESCRIPTION OF THE DRAWINGS

Embodiments of the present invention are illustrated in the accompanying figures where.

DETAILED DESCRIPTION OF THE INVENTION

The following detailed description provides illustrations for embodiments of the present invention. Each example is provided by way of explanation of the present invention, not in limitation of the present invention. Those skilled in the art will recognize that other embodiments for carrying out or practicing the present invention are also possible. Therefore, it is intended that the present invention covers such modifications and variations as come within the scope of the appended claims and their equivalents.

Figure 1:
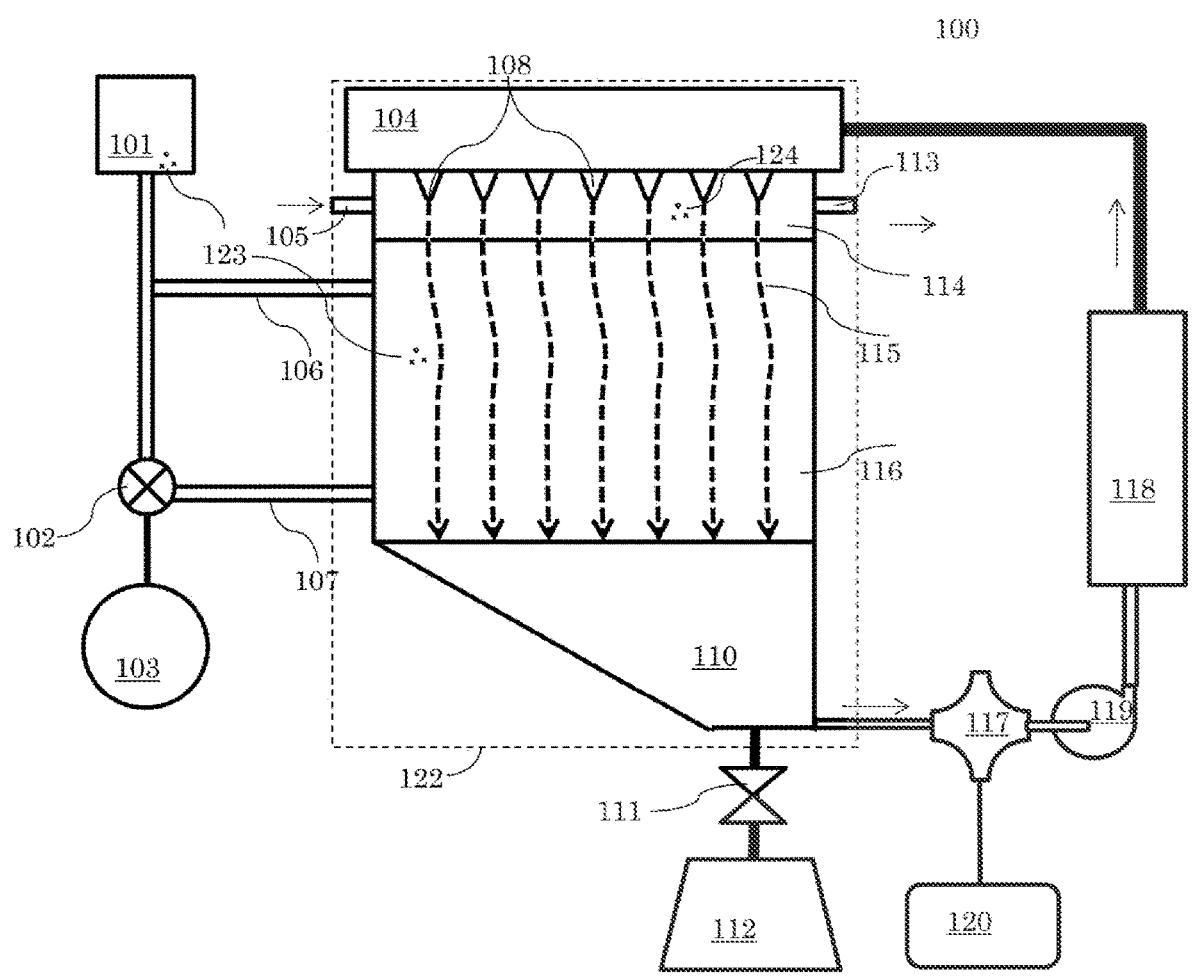
FIG. 1 depicts a schematic view of an embodiment of a "drop-through" liquid metal cooled molten salt reactor.

Referring to FIG. 1, a liquid metal cooled molten salt reactor 100 having a core 122 containing a liquid metal vessel 104 fluidly connected with a gas chamber 114, the gas chamber 114 is fluidly connected with a molten salt chamber 116, and the molten salt chamber 116 is fluidly connected with a hot liquid metal vessel 110. A fuel salt tank 101 contains a fuel salt 123, the fuel salt 123 is withdrawn from the fuel salt tank 101 through a fuel salt feeding tube 106 into the molten salt chamber 116, the fuel salt 123 is withdrawn from the molten salt chamber 116 through a fuel salt effluent tube 107 into a salt separator 102.

A purging gas inlet 105 inserts a purging gas 124 into the gas chamber 114 and the purging gas 124 is withdrawn from the gas chamber 114 through a purging gas outlet 113.

Figure 2:
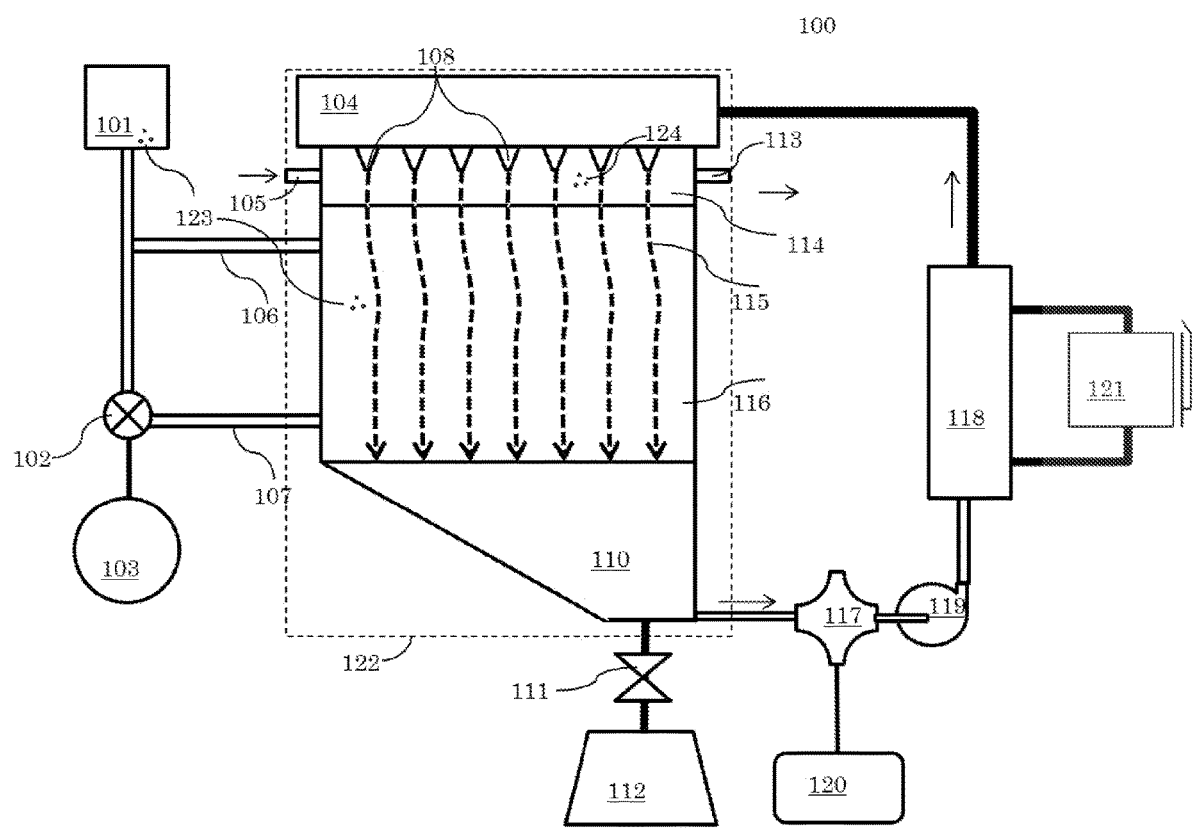
FIG. 2 depicts a schematic view of another embodiment of a "drop-through" liquid metal cooled molten salt reactor.

A liquid metal coolant 115 is dispensed from the liquid metal vessel 104 through a plurality of dispensing nozzles 108 first into the gas chamber 114 and then into the molten salt chamber 116. The liquid metal coolant 115 flows through the molten salt 123 into a hot liquid metal vessel 110. The liquid metal coolant 115 flows from the hot liquid metal vessel 110 through a liquid metal filter 117 into a liquid metal pump 119, and from there the liquid metal coolant 115 flows through a thermal exchanger 118 subsequently returning to the liquid metal vessel 104. In an embodiment a liquid metal cooled molten salt reactor 200, as shown in FIG. 2, the thermal exchanger 118 is connected to a steam generator 121.

Returning to FIG. 1, the liquid metal coolant 115 drops from a plurality of dispensing nozzles 108 into the molten salt chamber 116, and through the fuel salt therein into the hot metal vessel 110. Because the liquid metal coolant 115 is heavier than the fuel salt 123, the corresponding operation mode is called "drop-through" mode. In this case, the liquid metal coolant 115 could be lead, tin, lead-bismuth, and their other alloys with low melting temperatures. Typical fluorides such as $^7$LiF—BeF$_2$—ZrF$_4$—UF$_4$ or chlorides such as KCl—MgCl$_2$—UCl$_3$ can be used as the fuel salt. An additional advantage of flowing the liquid metal coolant 115 through the fuel salt 123 is that the liquid metal coolant 115 carries away fission products with high cross-sections for neutron adsorption. This in-reactor pyroprocessing is useful to improve the burn-up efficiency of the fuel. One further advantage of this operation is the possibility of converting or reducing some harmful off-gases emitted from the vessel such as O$_2$, Cl$_2$, HCl/HF, and $^3$T$_2$ through their reactions with the liquid metal coolant 115 in the core 122. The unfavorable products generated in the core 122 can be separated and discharged into a waste tank 120.

The present invention combines the advantages of molten salt reactors and liquid metal fluids. In the liquid metal cooled molten salt reactor 100, an isotope fuel, preferably in the form of its halides, is dissolved in a molten fuel salt 123. A liquid metal coolant 115 directly flows through the molten fuel salt 123 to carry away heat generated through the fission of the isotopes within the molten fuel salt 123 without using any cladding tubes, as prior art methods use. This design, the "drop-through" mode, eliminates the need of traditional fuel elements, leading to significant decrease in manufacturing cost and time. The direct heat exchange between the molten fuel salt 123 and liquid metal coolant 115 without the limitation of cladding improves heat exchange efficiency. The low-pressure operation enables the liquid metal cooled molten salt reactor 100 to have excellent safety which is an intrinsic attribute of molten salt reactors. Moreover, flowing the liquid metal coolant 115 through the molten fuel salt 123 also offers a promising approach of in-reactor processing wastes, generated during the fission, and operation for increased burn-up efficiency and simplified waste treatment. The above merits enable the liquid metal cooled molten salt reactor 100 to be a disruptive and transformational nuclear technology whose implementation will further extract the benefit of nuclear energy.

The fuel salt 123 is a nuclear fuel dissolved in a mixture of molten salts. The nuclear fuel may be solid or dissolved. The nuclear fuel can be $^{233}$UF$_4$, $^{235}$UF$_4$, and PuF$_3$. Because all liquid metal cooled reactors are fast-neutron reactors, two different types of liquid metals have been used as fuel: alkaline metals and heavy metals. Liquid metal fuels must have good heat transfer characteristics because fast neutrons generate a substantial amount of heat in a small space especially as compared to reactors of other classes. A low neutron absorption is desirable in any reactor coolant, but especially important for a fast reactor, as a good neutron economy of a fast reactor is one of its main advantages. Ideally, the liquid metal coolant will have a low moderation of neutrons because slower neutrons are more easily absorbed, and the liquid metal coolant will not cause excessive corrosion of the structural materials, and the liquid metal coolant's melting and boiling points are suitable for the liquid metal cooled molten salt reactor's operating temperature.

The first breeder reactor, Experimental Breeder Reactor I (EBR-I), used a sodium-potassium eutectic coolant. Since then, sodium has been chosen for larger experimental, prototypical, and commercial systems, due to its superior thermo-physical properties and relatively low cost. However, sodium coolants present an exothermic reaction with water, with release of hydrogen. Compared to alkaline metals, heavy metals have high thermal stability and acceptable density values although their thermal capacity and conductivity are lower. In addition, they are less chemically reactive in air and water. They have been considered for several applications in which sodium is less suitable, such as accelerator-driven systems and partitioning-and-transmutation dedicated reactors. The PbBi (LBE) alloy is particularly interesting since it has a high boiling point of approximately 1640° C. and a low inciting point of 125° C.

The overall chemistry of molten salt reactors strongly depends on the fuel, coolant, and fission product distributions. A variety of fluoride chemistries were studied as fuel salts or coolants for fluoride based molten salt reactors. A few examples are: $^7$LiF—BeF$_2$—ZrF$_4$—UF$_4$ (65-29-5-1 mol %, respectively), PuF$_3$—NaF—ZrF$_4$, 2($^7$LiF)—BeF$_2$, $^7$LiF—BeF$_2$—ThF$_4$—UF$_4$, and NaBF$_4$—NaF. A variety of chloride salts are also suitable for use in molten salt reactors including: NaCl—KCl—PuCl$_3$ or PuCl$_3$—NaCl (40% PuCl$_3$) as fuel salts, LiCl—KCl, KCl—MgCl$_2$ or LiCl—KCl—MgCl$_2$ as coolant salts, and MgCl$_2$ or CaCl$_2$ as diluents. In an embodiment, the fuel salt 123 is NaCl—KCl—PuCl$_3$ or PuCl$_3$—NaCl (40% PuCl$_3$).

Unlike the prior art, the liquid metal cooled molten salt reactor circulates liquid metal coolant 115 through the molten fuel salt 123. Thermophysical properties of candidate liquid metals, fluoride salts, and chloride salts are shown in Table 1. Different operation modes can be implemented according to their physical properties.

molten fuel salt 123. This embodiment is called a "bubble-up" mode. In this case, the liquid metal coolant 115 could be lithium, potassium, sodium, and sodium-potassium eutectic. Typical fluorides such as $^7$LiF—BeF$_2$—ZrF$_4$—UF$_4$ or promising chlorides such as KCl—MgCl$_2$—UCl$_3$ can be used as the fuel salt 123.

Figure 3:
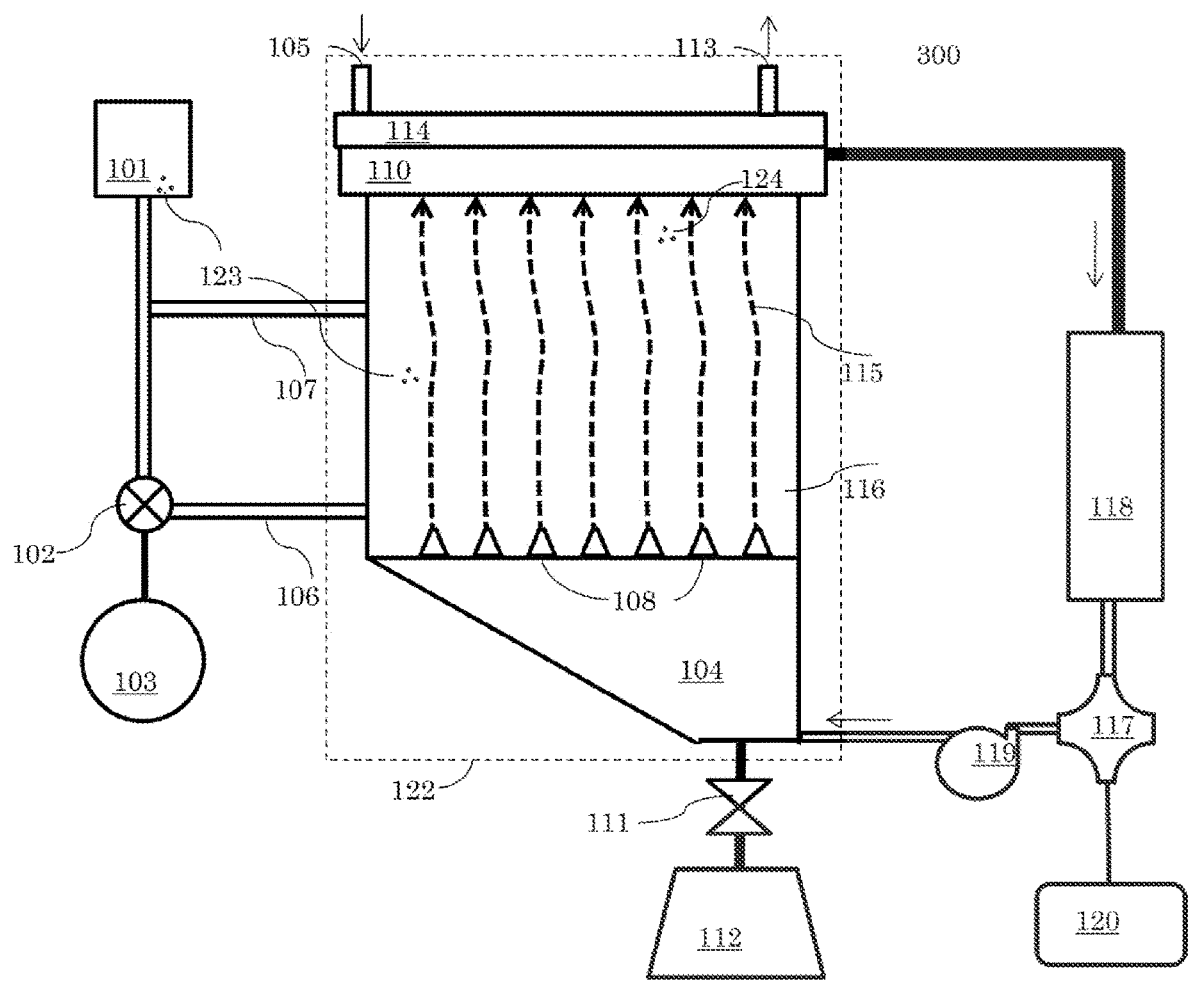
FIG. 3 depicts a schematic view of an embodiment of a "bubble-up" liquid metal cooled molten salt reactor.
Figure 4:
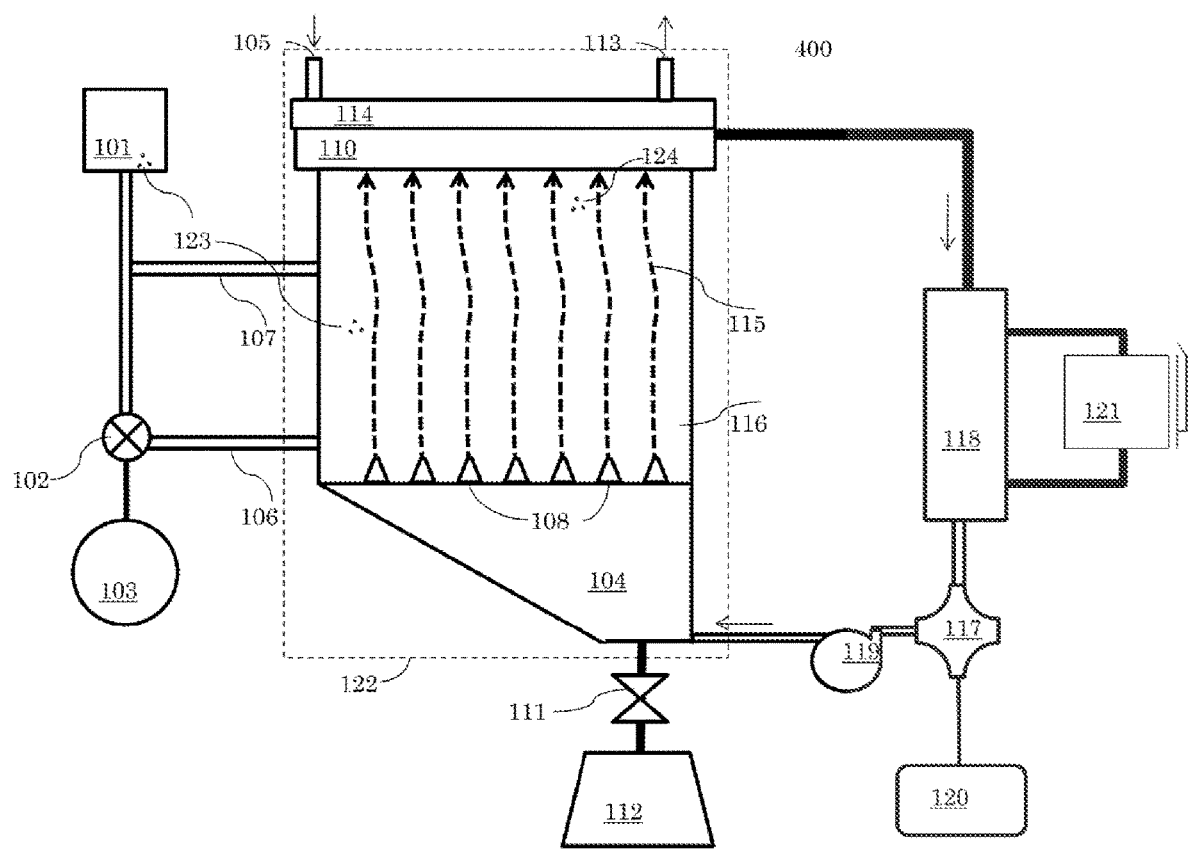
FIG. 4 depicts a schematic view of another embodiment of a "bubble-up" liquid metal cooled molten salt reactor.

During operation of the "bubble-up" embodiments shown in FIGS. 3-4, the liquid metal coolant 115 can flow up through the molten salt chamber 116 from the plurality of dispensing nozzles 108 fluidly connected to the liquid metal vessel 104. The liquid metal coolant 115 carries the heat away from the fuel salt 123 by the heat pump 119 to the heat exchanger 118 which, as shown in FIG. 4 can be connected to a steam generator 121. Returning to FIG. 3, the circulation of the cooled liquid metal coolant 115 back to the plurality of dispensing nozzles 108. Like the advantages of a drop-through liquid metal cooled molten salt reactor, flowing the liquid metal through the fuel salt enables the in-reactor pyroprocessing of some fission products and off-gases in a bubble-up liquid metal cooled molten salt reactor. The unfavorable products generated in the core 122 can be separated and discharged into a waste storage tank 120.

TABLE 1

Characteristics of molten salts and liquid metals [a]

| Coolants | $T_{melt}$ (° C.) | $T_{boil}$ (° C.) | $\rho$ (kg/m$^3$) | $C_p$ (kJ/kg ° C.) | $\rho C_p$ (kJ/m$^3$ ° C.) | $\kappa$ (W/m ° C.) | $\nu \times 10^6$ (m$^2$ s) |
|---|---|---|---|---|---|---|---|
| Sodium | 98 | 883 | 790 | 1.26 | 958.9 | 57.5 | 0.25 |
| Lead | 328 | 1750 | 10540 | 0.16 | 1700 | 16 | 0.13 |
| Lead-bismuth (44.5 Pb-55.5Bi wt %) | 125 | 1638 | 9710 | 1.46 | 14176 | 17.7 | 0.14 |
| Tin | 232 | 2687 | 6330 | 0.24 | 1519 | 33.8 | 0.16 |
| Lithium | 180 | 1347 | 436 | 4.16 | 1814 | 63.3 | 0.46 |
| LiF—Naf—KF (46.5-11.5-42 mol %) | 454 | 1570 | 2050 | 1.88 | 3854 | 0.6 | 1.43 |
| LiF—BeF$_2$ (67-33 mol %) | 460 | 1400 | 1960 | 2.41 | 4723 | 1.1 | 2.88 |
| LiCl—KCl (59.5-40.5 mol %) | 355 | 1400 | 1310 | 1.20 | 1572 | 0.38 | 0.90 |
| KCl—MgCl$_2$ (68-32 mol %) | 426 | 1418 | 1940 | 1.15 | 2231 | 0.40 | 0.73 |

[a] Approximate physical properties at 700° C. and 1 atm.
Nomenclature: $\rho$ is density;
$C_p$ is specific heat;
$\kappa$ is thermal conductivity;
and $\nu$ is viscosity.

The refueling of the fuel salt 123 from the fuel salt tank 101 can be obtained through a flow circuit including the fuel salt feeding tube 106, the fuel salt effluent tube 107, and a salt separator 102 used to separate depleted fuel-salt. A waste salt tank 120 can be introduced to store depleted or waste fuel-salt. Under emergency conditions, it can also accommodate some salts while the emergency pool 112 will accept necessary amounts of the mixture of the salt and the liquid metal through an emergency valve 111.

The system design for the proposed liquid metal cooled molten salt reactor technology and market evaluation will boost its development and demonstration. The good neutron economy makes the liquid metal cooled molten salt reactor an effective waste incinerator but also an excellent thorium breeder, outbidding even thermal MSRs while being more cost-effective.

Referring to FIG. 3, an embodiment of a liquid metal cooled often salt reactor 300 is shown. In this embodiment, the liquid metal coolant 115 flows upward from the dispensing nozzles 108 through the molten salt chamber 116 because the liquid metal coolant 115 is lighter than the Under emergency conditions, it can also accommodate some salts while the emergency pool can store necessary amounts of the mixture of the salt and the liquid metal through an emergency valve 111.

Other embodiments include any other designs involving direct flow of a liquid metal through a molten fuel-salt phase. In some embodiments, a secondary cooling loop will be employed to meet special requirements.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. A liquid metal cooled molten salt reactor comprising:
   a) a core containing a first liquid metal vessel fluidly connected with a gas chamber, the gas chamber fluidly connected with a molten salt chamber, and the molten salt chamber fluidly connected with a second liquid metal vessel;
   b) a fuel salt tank containing a fuel salt NaCl—KCl—PuCl$_3$, the fuel salt is withdrawn from the fuel salt tank through a fuel salt feeding tube into the molten salt chamber, the fuel salt is withdrawn from the molten salt chamber through a fuel salt effluent tube into a salt separator;
   c) a purging gas inlet, the purging gas inlet inserting a purging gas into the gas chamber, the purging gas is withdrawn from the gas chamber through a purging gas outlet; and
   d) a liquid metal coolant dispensed from the first liquid metal vessel through a plurality of dispensing nozzles positioned within the gas chamber, such that the liquid metal coolant is dispensed first into the gas chamber, and then flows into the molten salt chamber, the liquid metal coolant flows through the fuel salt in at least the molten salt chamber and receives heat from the molten salt chamber, the liquid metal coolant then flows into the second liquid metal vessel, the liquid metal coolant flows from the second liquid metal vessel through a liquid metal filter into a liquid metal pump, the liquid metal coolant flows from the liquid metal pump through a thermal exchanger in which the heat received from the molten salt chamber is removed from the liquid metal coolant, and the liquid metal coolant then returns to the first liquid metal vessel.

2. The liquid metal cooled molten salt reactor of claim 1 wherein the liquid metal coolant is lead, tin, lead-bismuth, or a combination thereof.

3. The liquid metal cooled molten salt reactor of claim 1 wherein the liquid metal coolant is dropped from the plurality of dispensing nozzles into at least the gas chamber.

4. The liquid metal cooled molten salt reactor of claim 1 wherein the fuel salt includes dissolved nuclear fuel $^{233}$UF$_4$.

5. A liquid metal cooled molten salt reactor comprising:
   a) a core containing a first liquid metal vessel fluidly connected with a gas chamber, the gas chamber fluidly connected with a molten salt chamber, and the molten salt chamber fluidly connected with a second liquid metal vessel;
   b) a fuel salt tank containing a fuel salt, the fuel salt is withdrawn from the fuel salt tank through a fuel salt feeding tube into the molten salt chamber, the fuel salt is withdrawn from the molten salt chamber through a fuel salt effluent tube into a salt separator;
   c) a purging gas inlet, the purging gas inlet inserting a purging gas into the gas chamber, the purging gas is withdrawn from the gas chamber through a purging gas outlet;
   d) a plurality of dispensing nozzles positioned within the gas chamber; and
   e) a liquid metal coolant dispensed from the first liquid metal vessel through the plurality of dispensing nozzles such that the liquid metal coolant is dispensed first into the gas chamber and then flows into the molten salt chamber, the liquid metal coolant flows through the fuel salt receiving heat from the molten salt chamber and flows into the second liquid metal vessel, the liquid metal coolant flows from the second liquid metal vessel through a liquid metal filter into a liquid metal pump, the liquid metal coolant flows from the liquid metal pump through a thermal exchanger in which the heat received from the molten salt chamber is removed from the liquid metal coolant, and the liquid metal coolant then returns to the first liquid metal vessel.

* * * * *